Sept. 9, 1952 D. S. BOND ET AL 2,610,292

FADING COMPENSATION RADIO SIGNALING SYSTEM

Filed March 12, 1946 3 Sheets-Sheet 1

INVENTORS
DONALD S. BOND.
LELAND E. THOMPSON.
BY H. S. Grover
ATTORNEY

INVENTORS
DONALD S. BOND
LELAND E. THOMPSON
BY H. S. Grover
ATTORNEY.

FADING COMPENSATION RADIO SIGNALING SYSTEM

Filed March 12, 1946 3 Sheets-Sheet 3

INVENTORS
DONALD S. BOND.
LELAND E. THOMPSON.
BY
ATTORNEY.

Patented Sept. 9, 1952 2,610,292

UNITED STATES PATENT OFFICE 2,610,292

FADING COMPENSATION RADIO SIGNALING SYSTEM

Donald S. Bond, Philadelphia, Pa., and Leland E. Thompson, Merchantville, N. J., assignors to Radio Corporation of America, a corporation of Delaware Application March 12, 1946, Serial No. 653,726

7 Claims. (Cl. 250—6)

The present invention relates to radio signalling systems and more particularly to those adapted for use in the ultra short wave region.

An object of the present invention is to reduce fading of microwaves.

Another object of the present invention is the reduction of interference in ultra short wave frequency signalling system due to multipath propagation.

A further object of the present invention is the improvement of radio relaying communication systems.

Still a further object of the present invention is the provision of a diversity system, particularly adapted for use with relay systems such as described in the copending application of L. E. Thompson, Serial Number 576,453, filed February 6, 1945, issued July 11, 1950, as U. S. Patent 2,514,425.

The foregoing objects and others which may appear from the following detailed description are attained by providing two or more antennas at a receiving point, one above the other, the heights being so chosen that the lower or normal ray is received much better by the upper antenna. Then when multipath phenomena cause destructive interference at the upper antenna the abnormal ray produces a much stronger signal at the lower antenna than in the unperturbed condition. Alternatively, the heights of the two antennas, one above the other, may be so chosen that each antenna receives a signal of substantially the same strength under normal conditions. Under multipath conditions when, for example, two waves arrive at one of the antennas exactly 180 degrees out of phase with each other, the arrival of the two waves at the other antenna will not be 180 degrees out of phase but will be a greater or less amount so that there will be a useful resultant. The outputs from the two antennas are combined by a diversity combining means to obtain a signal substantially free from this type of fading.

The present invention is particularly adapted for but not limited to use in relay systems wherein a double angle modulated wave is used. By angle modulation we mean that type of modulation wherein a characteristic of a continuous wave other than its amplitude is varied in accordance with a signal. More specifically, the angle modulation may be pure frequency modulation or pure phase modulation of some type of modulation having both components. By double angle modulation is meant a system in which one or more signal channels are used to angle, frequency or phase modulate a common subcarrier frequency and this common modulated frequency is then employed to angle, frequency or phase modulate a wave of still higher frequency of a value suitable for radio transmission.

Single angle modulation or amplitude modulation of the transmitted carrier may be used if desired. Furthermore, the use of our present invention for relaying or broadcast reception of television signals is specifically contemplated.

In the following description and in the accompanying drawings certain values of frequency may be given for the carrier channels, heights of towers, relay distances, etc. However, it is to be clearly understood that these values have been chosen so as to present a typical example which may be varied but obviously widely different choices as to frequency and other values may be made. Hence, the invention is not to be considered as limited to the values chosen for illustrative purposes.

The following detailed description is accompanied by a drawing in which.

Figure 3:
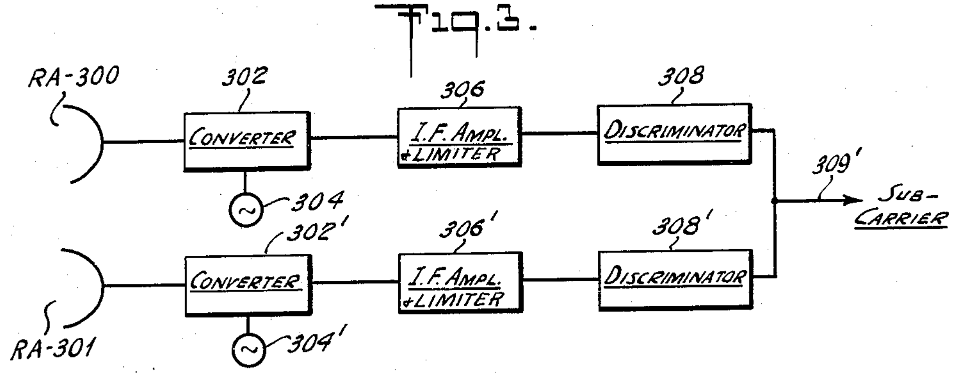
Figure 3 illustrates in block diagram form an embodiment of the present invention.
Figure 5:
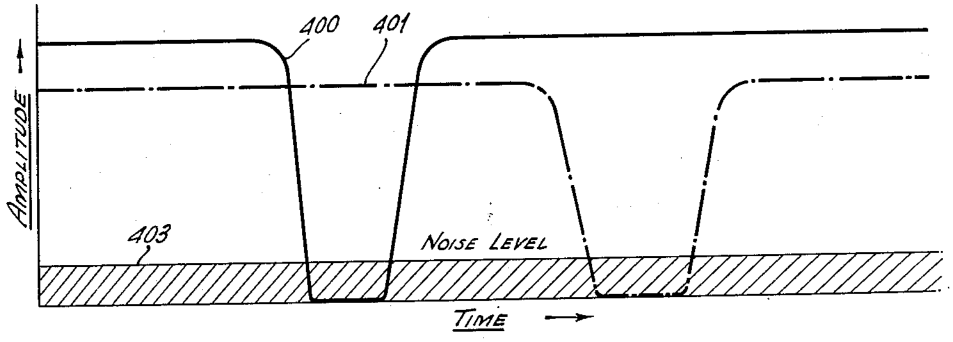
Figures 6, 7:
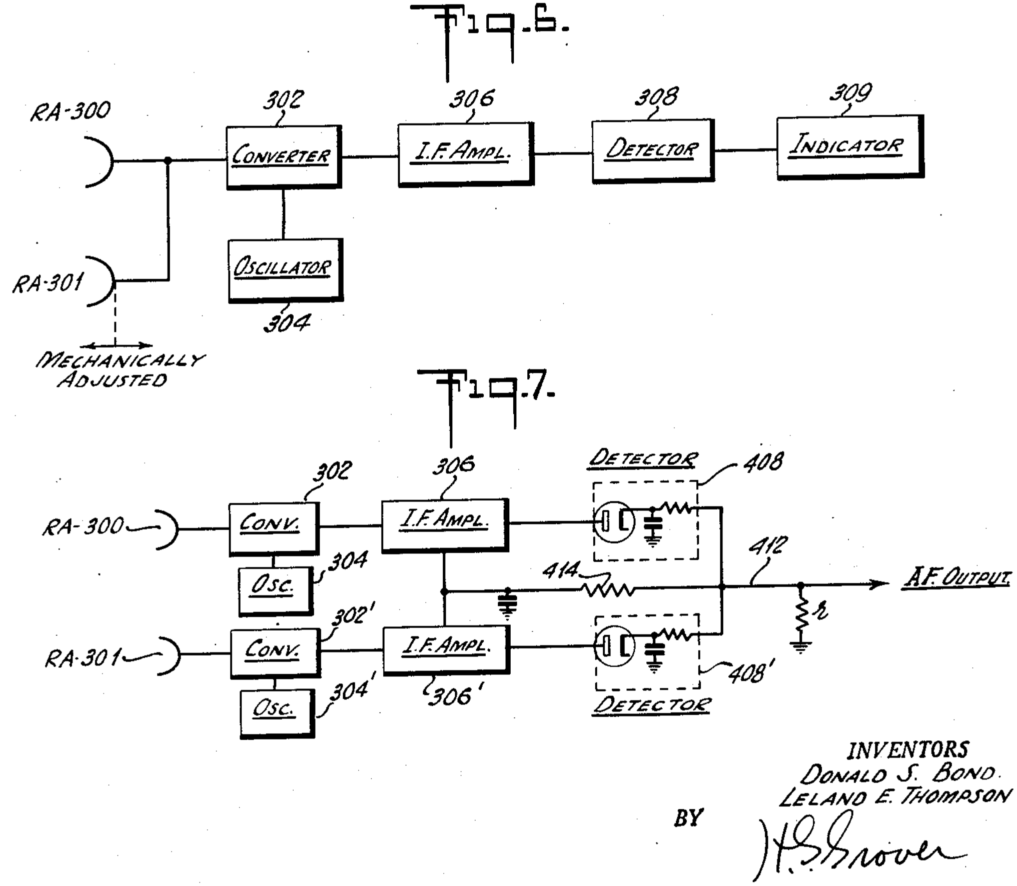
Figure 8:
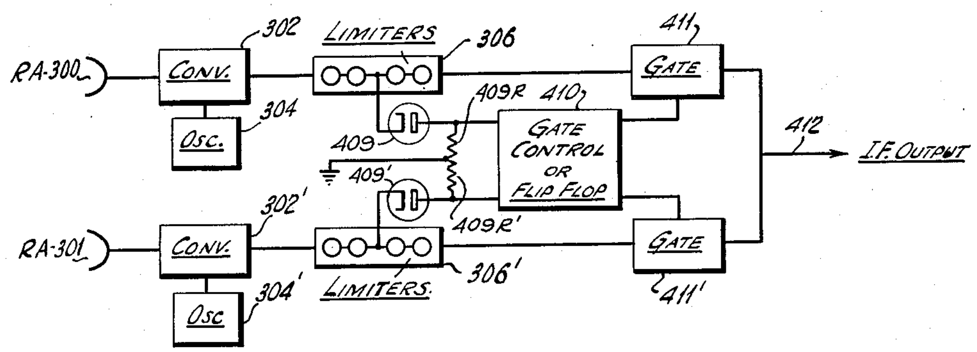
Figure 9:
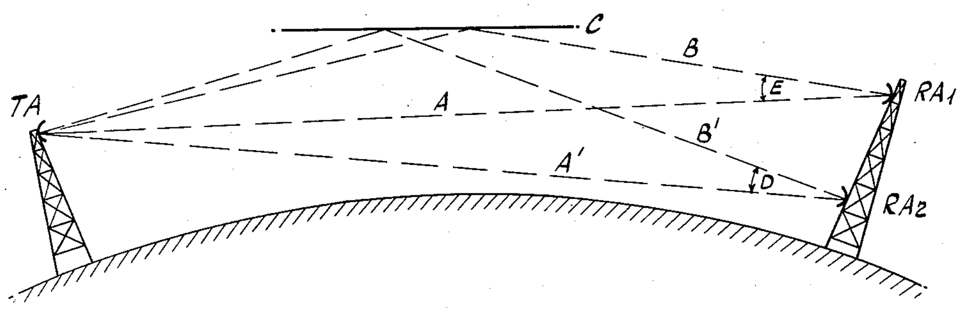
Figure 10:
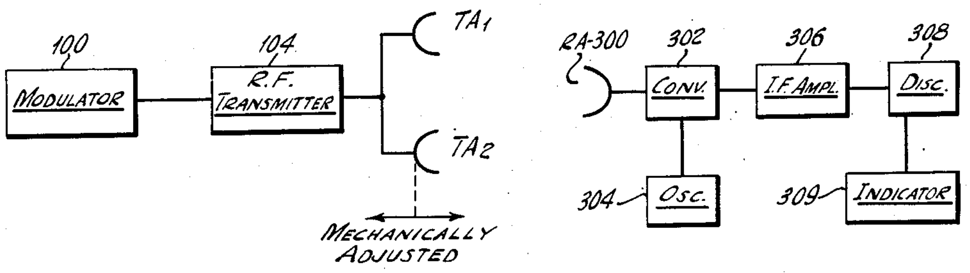

Figure 5 illustrates in a chart form the combining action in the output of the system shown in Figure 3 whereby a substantially constant signal amplitude is obtained, and Figure 6 illustrates a further modification of the present invention, while Figures 7 and 8 illustrate in block diagram form two further diversity systems which may be used with one vertically spaced antenna arrangement to overcome fading, while Figure 9 illustrates in plan view an arrangement of transmitting and receiving antennas useful in understanding the present invention, and Figure 10 illustrates a further modification of the present invention.

Figure 1:
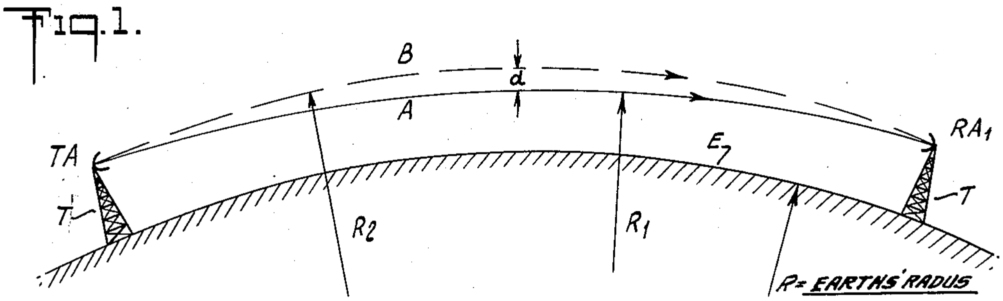
Figures 1 and 2 illustrate in plan view a section of the earth's surface with transmitting and receiving locations indicated thereon. The curvature of the earth is enormously exaggerated in order to facilitate explanation of the invention.

Reference will be made to Figure 1 wherein E denotes the surface of the earth. Located thereon is a transmitting station having a transmitting antenna TA mounted at the top of a suitable tower T. The antenna is preferably highly directive and may include a parabolic reflector or other wave directing structure. A horn termination of a wave guide may also be used. The antenna may be of the type shown in Figure 10 of the Thompson application previously referred to. At another location is established receiving equipment having a receiving antenna RA associated therewith mounted on a suitable tower T. The receiving equipment may be the termination of the system or it may be the input of a relay station in which case further transmitting antennas directed toward further receiving equipment may be used. Now it is known that in the lower troposphere surrounding the earth the index of refraction may vary with height changes from time to time. The lower density gradient or gradient of refraction of the lower troposphere is such that a ray between the transmitting antenna and receiving antenna in Figure 1 follows a curved path A having the radius $R_1$ somewhat greater than that of the earth. It has been found that under unperturbed conditions of the lower atmosphere the value of radius $R_1$ is approximately four times that of R, the earth's radius. Now, if a gradient exists of a type causing the ray path to bend more at greater elevation above the earth's surface, a second path B of radius $R_2$ may exist. Radius $R_2$ is less than radius $R_1$. Therefore, the two rays travelling over paths A and B arrive at the receiving antenna RA in differing phase relationships. If this difference is an odd multiple of a half wavelength, destructive interference occurs causing a minimum value of signal which may be very near to zero because of the substantial equality of attenuation along the paths A and B.

Computations based on the geometry of Figure 1 disclose that path B need lie only a few 10's or 100's of feet above path A as indicated by the distance $d$ for path lengths of 20 to 40 miles in order to produce the first minimum in which the path difference is one half a wavelength. As atmospheric conditions change such that radius $R_2$ becomes less and less, the distance between TA and RA for which destructive interference first occurs becomes substantially less. For example, at a distance of 30 miles where $R_1=4R$, then when $R_2=R$, the first minimum occurs for a frequency of 3,300 megacycles per second.

Experimental results have verified this picture of variations of signal intensity. There is a type of fading that is observed under many conditions, especially in summer months, that is characterized by a rapid diminution in signal from its normal or unperturbed value to substantially zero intensity. There may be variations during which the signal rises for short durations of time above the normal value and at somewhat later time the signal may reduce rapidly to a normal value. Such a period of fading may occupy a few minutes or perhaps up to half an hour under the typical propagation conditions encountered. The nature of the fading phenomena suggests the cancellation of signals along two or more paths, the signals being individually rather strong.

From the geometry of ray paths A and B of Figure 1 it may be determined that the height of antenna TA or antenna RA determines whether the two signals are in phase or out at any particular instant of time. According to an aspect of the present invention it is proposed to install one or more additional antennas at either the receiving or transmitting location or both in order to provide two or more circuits whose output may be combined in a diversity fashion.

Figure 2:
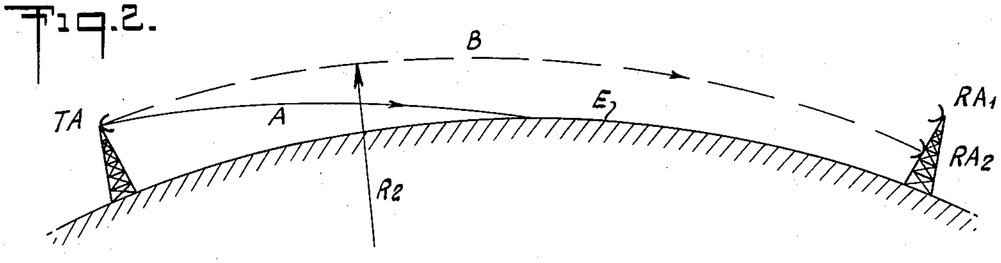

In Figure 2 is shown an arrangement wherein spaced antennas are used at the receiving location only. However, it will be understood that the same results may be achieved if the separation is effected at the transmitter location instead, or at both loctions. Thus, in Figure 2 a pair of receiving antenna $RA_1$ and $RA_2$ are mounted on the receiving tower T. The second antenna $RA_2$ is installed at a lower elevation on the receiving tower. The location is so chosen in this illustration that under conditions in which the medium is unperturbed, the path A represents a ray whose intensity at $RA_2$ is rather small. This result will be obtained when the receiving antenna $RA_2$ is located below the effective horizon for path A. It is so shown in the figure, path A intersecting the surface of earth E before arriving at the receiving location. Then when abnormal propagation of the type resulting in the undesired phenomenon, as described above, is encountered, ray B will be received at antenna $RA_2$ with an intensity comparable to that obtained at $RA_1$. However, the interference phenomena will not be the same as before because under this condition only ray B will be received at the receiving antenna $RA_2$. Thus, antenna $RA_1$ may be receiving waves over two paths and arriving 180 degrees out of phase so as to result in a zero signal while antenna $RA_2$ will be receiving a strong signal represented by ray B in Figure 2. If the outputs of the antenna systems $RA_1$ and $RA_2$ are combined as described hereafter the resultant output is substantially less affected by the interference type of fading described.

Experiments we have conducted have demonstrated that the signal of the receiving antenna $RA_1$ need not be zero in order to receive the benefits of the antenna $RA_2$. It appears sufficient to establish an appreciable difference in heights of the antennas to secure conditions in which fading is not simultaneous. For example, over a 28 mile path, for which the transmitting antenna is located approximately 250 feet above the surface of the earth, it is sufficient to locate the receiving antenna $RA_1$ at a height of 100 feet above the surface of the earth and receiving antenna $RA_2$ at a height of 50 feet in order to secure marked diminution of the fading phenomena.

One method of combining the outputs of antennas $RA_1$ and $RA_2$ will now be described with reference to Figure 3. The system shown in this figure is especially suited to the system of radio signalling employing a double frequency-modulation scheme with a sub-carrier as described in the copending application of L. E. Thompson, Serial Number 576,453, filed February 6, 1945. Receiving antennas RA–300 and RA–301 located as indicated in Figure 2 are arranged to receive signals from the transmitting antenna TA. The communication wave energy from antenna RA–300 is heterodyned in converter 302 with a wave from a local beating oscillator 304 to produce intermediate frequency which may be of the order of 30 megacycles plus or minus one megacycle. The waves of intermediate frequency are amplified in the intermediate amplifier 306 and then fed to a discriminator 308. Similarly the wave energy received at receiving antenna RA–301 is heterodyned in converter 302′ with a wave from a local beating oscillator 304′ in order to produce a second intermediate frequency of 30 megacycles per second. If desired oscillator 304 may be used for both converters 302 and 302′. The waves of intermediate frequency from the converter 302' are amplified in the intermediate frequency amplifier 306' and fed to discriminator 308'. The output of discriminator 308 and 308' consists of sub-carrier signals of identical characteristics each frequency modulated, so as to cover a band of plus or minus 400 kilocycles per second about a base frequency of 1.0 megacycle per second. Due to the existence of limiters in each of the intermediate amplifiers 306 and 306', the level of the sub-carrier in each channel is substantially constant until the signal threshold of the radio frequency system is reached. A further decrease of the signal, however, then causes an abrupt diminution of the sub-carrier. Then, when the two sub-carriers are combined in a single channel 309', they may be additive if they are substantially of the same level or only the stronger may be significant in the following stages. If one channel loses its input altogether the noise will not rise to the point where it interferes with the sub-carrier of the other channel by the nature of the frequency modulation signal characteristics.

This is illustrated in Figure 5 wherein the signal level of the sub-carriers through the two channels 308 and 308' are indicated by curves 400 and 401. The maximum noise level in the channels is indicated by the cross hatched area below line 403. It will be noted from these curves that small differences in amplitude of the sub-carriers represented by curves 400 and 401 are of no significance because of the limiting action of the sub-carrier that occurs in the final demodulation process. Thus, with no auxiliary combining circuits, it becomes possible to obtain the diversity effect desired.

Figure 4:
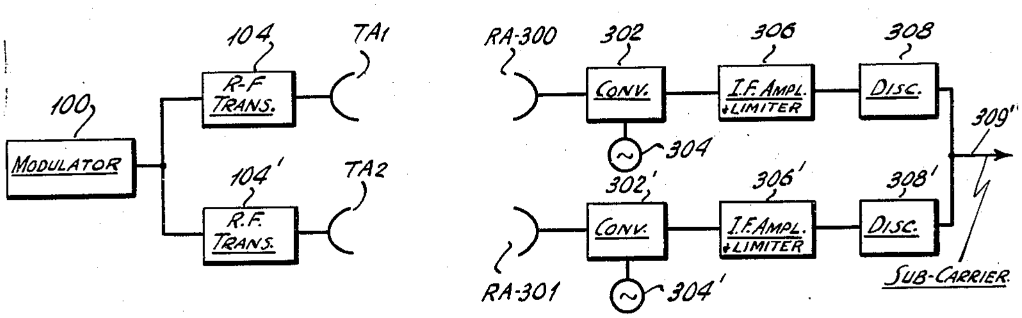
Figure 4 illustrates a modification thereof.

The method of generation of signals described in the Thompson application to which reference has been made also permits diversity action in the transmission of signals in the manner illustrated in Figure 4. Here a single modulator 100 is used to control two radio frequency oscillators of different frequency 104 and 104'. These in turn feed antennas $TA_1$ and $TA_2$ that are spaced in accordance with the methods described above. In the receiving location, it may be desirable to place all of the antenna arrangements; that is, the antennas RA-300 and RA-301, close together. However, due to the spacing between the transmitting antennas $TA_1$ and $TA_2$ the diversity effect will be still realized. As a further modification, the receiving antennas 300 and 301 may also be separated. The receiving structure operates just as described above with reference to Figure 3.

Alternatively, if both antennas $RA_1$ and $RA_2$ are so located as to provide a normal line of sight path to the transmitter, normal propagation provides about the same received signal at each antenna. However, when abnormal conditions ensue, the phase of the received signals on each of the antennas $RA_1$ and $RA_2$ is not such as to cancel at both antennas at the same time. This may be explained by reference to Figure 9 where for convenience the ray paths are shown as straight lines and an equivalent reflecting plane C is shown instead of the curved paths A and B of different radius of curvature as shown in Figure 1. A signal over paths A and B arrives at antenna $RA_1$ and a signal over paths $A^1$ and $B^1$ arrives at antenna $RA_2$. If the reflecting plane C is at a particular height above the earth, the path length B will be a half wave-length longer than the path A. Then the resultant signal in the antenna $RA_1$ will be very low and may, as experience has shown, be substantially zero.

However, the path $B^1$ to antenna $RA_2$ differs from path $A_1$ by a greater amount than a half wavelength and a resultant useful signal will be received by $RA_2$. This is apparent from an examination of the geometry of Figure 9 where it is observed that angle D is larger than angle E. The heights of the antennas and the reflecting plane C have been greatly exaggerated with respect to the distance between the transmitter antenna TA and the receiver antennas $RA_1$ and $RA_2$. An accurate geometric calculation shows that for a transmission distance of 36 miles and a frequency of 4000 megacycles and a separation of 16.5 feet between $RA_1$ and $RA_2$ that when path B is just a half wavelength longer than path A, then path $B^1$ differs from path $A^1$ by an amount greater than a half wavelength such that the signal over path $B^1$ differs from the signal over path $A^1$ by a phase angle of 208.5 degrees. This gives a resultant signal at $RA_2$ of 0.5 times the normal value present when multipath effects are absent. The equivalent reflecting plane C may be at such a height above the earth that the difference between path B and path A may be $3/2$ or $5/2$ or $7/2$, etc. of one wavelength which also produces a minimum signal at antenna $RA_1$. It has been found by geometric calculation that in these cases the received signal at $RA_2$ is even greater than in the case of $1/2$ wavelength difference. It is of course understood that the layer C may be such a height as to give a zero signal at $RA_2$ but in like manner the signal at $RA_1$ is then of a usable value. If the distance between the antennas $RA_1$ and $RA_2$ is too great, then conditions of zero signal may result at both $RA_1$ and $RA_2$ simultaneously. For example, path length B may differ from A by one-half wavelength and path length $B^1$ may differ from $A^1$ by $3/2$ wavelength. To overcome this effect it is proposed to restrict the antenna separation to a value less than about 50 feet for the example chosen where the distance is 36 miles and the frequency is 4000 megacycles.

Another method of combining signals which may be used is shown in Figure 6. Here the lower antenna RA-301 is connected directly in parallel to the higher antenna RA-300. Lower antenna RA-301 is arranged to be mechanically adjusted in position relative to antenna RA-300 in a horizontal direction so that the phase of the signals picked up by the two antennas under normal conditions are additive. This phase adjustment may also be accomplished by a variable length in the transmission line to one of the antennas or by means of an electrical network connecting the two antennas together. Then, under conditions which cause a signal resultant of zero on the antenna RA-300, the antenna RA—301 still supplies a useful resultant to signal to converter 302. The remainder of the system shown in Figure 6 may be the same as that described with reference to Figure 4 and described in detail in the above-mentioned prior filed Thompson application. It may also be any type of receiving equipment such as television with either amplitude or frequency modulation. It may also be a pulse transmission receiver. The receiving equipment is generally identified by reference numeral 309. The receiver may include signal strength indicating means. It has heretofore been found that the system of Figure 6 is not useful at medium frequencies where long distance circuits using diversity antennas spaced in a horizontal plane are used. However, at microwave frequencies and for distances of the order of 50 miles, the conditions are different. Here the path length difference may most commonly be one half wavelength or three half wavelengths instead of the difference of many wavelengths which may occur in medium frequency long distance circuits. Thus, the destructive combination of energy from antennas RA-300 and RA-301 cannot take place.

The diversity system shown in Figure 7 and which is usable with the vertically spaced antenna arrangement of Figure 2 utilizes, as before, a pair of directive receiving antennas RA-300 and RA-301. Also as before, the signals picked up by the two antennas are converted to an intermediate frequency in converters in 302 and 302' by beating them with locally generated wave generated in oscillators 304 and 304'. At intermediate frequency the signals are amplified in amplifiers 306 and 306' and detected in detectors 408 and 408' to obtain the audio frequency modulation carried by the signals. The audio frequency modulations are combined in a single output channel 412. The detectors 408 and 408' in addition to separating the carrier wave from the modulations carried thereby develop a direct potential negative with respect to ground proportional in strength to the amplitude of the received signals. This negative potential is applied through decoupling network 414 to control the gain of intermediate amplifiers 306 and 306'. Then, when only one of the channels is carrying any appreciable signals the resultant direct current biases the other intermediate frequency amplifier to such a point that it substantially ceases to amplify thereby cutting out noise in the idle channel.

A further modification shown in Figure 8 utilizes the same antenna arrangement and converters as previously described. Here, however, the intermediate frequency amplifiers 306 and 306' each contain limiters. The limiters develop negative potentials in proportion to the amplitude of the signals appearing in the amplifiers. The potential developed in amplifier 306 is applied through diode 409 to the gate control or flip-flop circuit 410. Similarly the negative potential developed in amplifier 306' is applied through diode 409' to the gate control 410. The gate control 410 selectively operates gates 411 and 411' so that only one of the two channels is operative at any time to provide output signals in the output lead 412. The diodes 409 and 409' beween the limiters and gate control 410 prevent the limiter in amplifier 306 from influencing the operation of the limiter in amplifier 306' and vice-versa. A pair of resistors 409R and 409R' connected between ground and diodes 409 and 409' respectively serve as load elements for the diodes and form a control voltage deriving circuit. The potentials developed at the ungrounded ends of resistors 409R and 409R' will be of like negative polarity with respect to ground. But if the voltages are unequal one end of the potential combining circuit constituted by the series connection of resistors 409R and 409' will be positive or negative with respect to the other end. Flip flop circuit 410 responds to the changes in relative polarity of the series connected resistors 409R and 409R' constituting the control voltage designating circuit to open and close gates 411 and 411' alternately. Examples of such circuitry will be found on referring to U. S. Patents 2,106,342, issued January 25, 1938, to Stephan Doba, Jr., and 2,515,668, issued July 18, 1950, to Robert E. Schock.

If desired, a transmitting arrangement as shown in Figure 10 may be used. Here the transmitter 104 supplies a pair of antennas $TA_1$ and $TA_2$ arranged one above the other as described for the receiving antennas of Figure 6. One of the antennas is arranged to be shifted along its line of directivity or a phase shifter may be inserted into one of the transmission lines feeding the antennas. The receiver utilizes a single antenna RA-300 feeding converter 302. The remainder of the figure corresponds to Figure 6 so it will not be again described. Normally signals arrive at RA-300 from only one of the transmitting antennas $TA_1$ and $TA_2$ but under abnormal propagation conditions when destructive interference takes place over this path, the other transmitting antenna is so located that its energy now arrives a RA-300 and supplies a usable signal for the duration of the interference.

The above-mentioned diversity arrangements may also be used over sea as well as over land where the communication path may be between two ships at sea or between a land station and a ship. The movement of either the transmitter or receiver or both, causes the wave reflected from the surface of the sea, at some periods of time, to cancel the direct wave. By utilizing the present arrangement the effects of such cancellation are avoided.

The apparatus to be employed in systems such as shown herein in Figure 3 preferably follows the design of similar apparatus shown in the copending application of Leland E. Thompson, Serial No. 576,453, filed February 6, 1945. Thus, Figure 3 may represent the receiving end of the relaying system of Figure 2 of the copending Thompson application or it may equally well represent the similar portion of the receiving terminal of Figure 3 of the Thompson application. Receiving antennas RA-300 and RA-301 may follow the construction shown in Figure 10 of the Thompson application. The waves received by the receiving antennas RA-300 and RA-301 of Figure 3 of this application may have the carrier frequencies and deviations or modulations such as described in the Thompson application. The local oscillators 304, 304' and 302, 302' may follow the construction and operation of the apparatus diagrammatically illustrated in Figure 7 of the Thompson application. The intermediate frequency amplifier 306, 306' may be designed to follow the construction of the intermediate frequency amplifier 206 of Figure 2 of the Thompson application or amplifier 306 of Figure 3 of the Thompson application.

The discriminator detector apparatus 308, 308' of Figure 3 of this application may follow the design and construction of similar apparatus shown in Figure 8B of the copending Thompson application.

However, it is to be clearly understood that the present system for reducing the effects of fading when signalling with very short waves is not limited to a multiplex system or to a multiple modulation system such as described in the Thompson application although particularly useful therefor, but may be used equally well for other systems such as employed for simplex signalling making use of single modulation or direct modulation of the emitted or transmitted carrier wave by the signal. Similarly, it is to be understood that the apparatus itself need not follow that of the Thompson application, but other forms of construction of the apparatus may be used.

While we have illustrated several embodiments of the present invention, it should be clearly understood that it is not limited thereto since many modifications may be made in the several elements employed and in their arrangement without departing from the spirit and scope of the invention.

What is claimed is:

1. An ultra high frequency communication system including, at one location, a transmitter of double angle modulated wave energy and, at another location, a receiver for said energy, an antenna at said receiving location arranged to receive substantially all of said wave energy over one path between the transmitter at said one location and said antenna at said receiving location under conditions of normal wave propagation between said locations, a second antenna arranged at said receiving location to receive substantially all of said wave energy over a second path between the transmitter at said one location and the other antenna at said receiving location under abnormal wave propagation conditions, said paths having different lengths to effect destructive interference at said receiving location, said antennas being spaced in the vertical direction, means separately to convert the individual signals received by said two antennas to a common intermediate frequency, intermediate frequency amplifiers including limiters to amplify said converted signals, means to apply said amplified signals to a common output channel, an electronic gate circuit interposed between each of said amplifiers and said common channel, rectifier elements individually coupled to said amplifiers, load resistors coupled between said rectifiers and a point of fixed reference potential and a flip flop circuit coupled to the junction points between said resistors and said rectifiers and connected to said gate circuits to open and close the same alternately in response to the potentials developed across said resistors.

2. An ultra high frequency communication system including, at one location, a transmitter of wave energy and, at another location, a receiver for said energy, an antenna at said receiving location arranged to receive substantially all of said wave energy over one path between the transmitter at said one location and said antenna at said receiving location under conditions of normal wave propagation between said locations, a second antenna arranged at said receiving location to receive substantially all of said wave energy over a second path between the transmitter at said one location and the other antenna at said receiving location under abnormal wave propagation conditions, said paths having different lengths to effect destructive interference at said receiving location, said antennas being spaced in the vertical direction, means separately to convert the individual signals received by said two antennas to a common intermediate frequency, intermediate frequency amplifiers including limiters to amplify said converted signals, means to apply said amplified signals to a common output channel, an electronic gate circuit interposed between each of said amplifiers and said common channel, rectifier elements individually coupled to said amplifiers, load elements coupled between said rectifier elements and a point of fixed reference potential to develop direct voltages thereacross individually proportional to the amplitude of the signals in said amplifiers, and a gate control circuit arrangement having the input circuit thereof connected across the series connection of said load elements and the output circuit thereof coupled to said electronic gate circuits selectively to open and close the same in response to the resultant of said voltages developed across said load elements to apply the signal of higher level only to said common channel.

3. In an ultra high frequency diversity receiving system including means to receive individual signals of given desired wave energy under conditions normally producing destructive interference, means separately to convert the individual signals received to a common intermediate frequency, intermediate frequency amplifiers including limiters to amplify said converted signals individually, and means to apply said amplified signals to a common output channel, an electronic gate circuit interposed between each of said intermediate frequency amplifiers and said common output channel, a rectifier coupled to each of said limiters, a control voltage discriminating circuit coupled to said rectifiers and a flip-flop circuit coupled to said gate circuits and said discriminating circuit effective to apply only the amplified signal having the greater amplitude to said common output channel.

4. In a wavelength modulation diversity receiving system having means producing two signal voltages representative of the same signal but varying in qualitative sense, means individually limiting the amplitude of said voltages, and an output channel, means to select the better of the two voltages including an electronic gate coupled between each of said limiting means and said output channel, an electronic flip-flop circuit coupled to said electronic gates, a rectifier circuit coupled to each of said limiting means to produce a potential proportional to the amplitude of the respective signal voltage at the output of said limiting means, a potential combining circuit interconnecting said rectifier and said flip-flop circuit to apply a control potential thereto to actuate said electronic gates to apply the signal voltage of greater amplitude only to said output channel.

5. In an ultra-high frequency diversity receiving system including means to receive individual signals of given desired wave energy under conditions normally producing destructive interference, means separately to translate the signals received, amplifiers including limiters individual to said signals and coupled to said translating means, gating means coupled to said limiters to apply said translated signals to a common output channel, a rectifier coupled to each of said translators, resistors connected in series between said rectifiers with the junction between the resistors connected to a point of fixed reference potential, and a flip-flop circuit coupled to said gating means and across said series connected resistors effective to apply only the translated signal having the greater amplitude to said common output channel.

6. In an ultra-high frequency diversity receiving system including means to receive individual signals of given desired wave energy under conditions normally producing destructive interference, means to convert separately the signals received to a common intermediate frequency. intermediate frequency amplifiers including limiters to amplify said converted signals individually, and electric path connections between amplifiers and a common output channel, an electronic gate circuit interposed between each of said amplifiers and said common output channel, a rectifier coupled to each of said amplifiers, a resistor connected between a point of fixed potential and each of said rectifiers and a flip flop circuit coupled to said gate circuits and across said series connected resistors effective to prevent only the amplified signal having the lesser amplitude from reaching said common output channel.

7. In an ultra-high frequency communication system including means to receive individual signals of given desired wave energy under conditions normally producing destructive interference, amplifiers including limiters to amplify said received signals individually, and means to apply said amplified signals to a common output channel, an electronic gate circuit interposed between each of said intermediate amplifiers and said common output channel, a rectifier coupled to each of said amplifiers, a control voltage deriving circuit coupled to said rectifiers, said circuit comprising resistors connected between said rectifiers and point of fixed reference potential, the control voltage being derived across the series connection of said resistors, and a flip-flop circuit coupled to said gate circuits and said control voltage deriving circuit effective to apply only the amplified signal having the greater amplitude to said common output channel.

DONALD S. BOND.
LELAND E. THOMPSON.

REFERENCES CITED

The following references are of record in the file of this patent:

UNITED STATES PATENTS

| Number | Name | Date |
|---|---|---|
| 1,739,520 | Potter | Dec. 17, 1929 |
| 1,794,418 | Potter | Mar. 3, 1931 |
| 2,004,107 | Goldsmith | June 11, 1935 |
| 2,069,813 | Beverage et al. | Feb. 9, 1937 |
| 2,086,742 | Scharlau | July 13, 1937 |
| 2,125,977 | Zworykin | Aug. 9, 1938 |
| 2,196,187 | Blair | Apr. 9, 1940 |
| 2,213,859 | Hahnemann | Sept. 3, 1940 |
| 2,249,425 | Hansell | July 15, 1941 |
| 2,282,526 | Moore | May 12, 1942 |
| 2,286,839 | Schelkunoff | June 16, 1942 |
| 2,293,501 | Hansell | Aug. 18, 1942 |
| 2,303,644 | Katzin | Dec. 1, 1942 |
| 2,310,692 | Hansell | Feb. 9, 1943 |
| 2,422,076 | Brown | June 10, 1947 |
| 2,494,309 | Peterson et al. | Jan. 10, 1950 |
| 2,503,957 | Lyons | Apr. 11, 1950 |
| 2,515,668 | Schock et al. | July 18, 1950 |
| 2,545,214 | Schock | Mar. 13, 1951 |

FOREIGN PATENTS

| Number | Country | Date |
|---|---|---|
| 494,223 | Germany | Apr. 3, 1930 |
| 668,570 | France | Nov. 4, 1929 |